US007010916B2

(12) United States Patent
Sumser et al.

(10) Patent No.: US 7,010,916 B2
(45) Date of Patent: Mar. 14, 2006

(54) EXHAUST-GAS TURBOCHARGER

(75) Inventors: Siegfried Sumser, Stuttgart (DE); Helmut Finger, Leinfelden-Echterdingen (DE); Eduard Heinz, Remseck (DE); Lionel Le Clech, Stuttgart (DE); Wolfram Schmid, Nürtingen (DE)

(73) Assignee: DaimleChrysler AG, Stuttgart (DE)

( * ) Notice: Subject to any disclaimer, the term of this patent is extended or adjusted under 35 U.S.C. 154(b) by 0 days.

(21) Appl. No.: 10/861,111

(22) Filed: Jun. 4, 2004

(65) Prior Publication Data

US 2004/0255582 A1 Dec. 23, 2004

(30) Foreign Application Priority Data

Jun. 7, 2003 (DE) ................................ 103 25 980

(51) Int. Cl.

*F02D 23/00* (2006.01)
*F04B 17/00* (2006.01)
*F01D 5/08* (2006.01)
*F01D 5/18* (2006.01)
*F02C 6/12* (2006.01)

(52) U.S. Cl. ........................ 60/602; 417/406; 417/407; 416/97 R; 415/175; 415/178; 415/114

(58) Field of Classification Search .................. 60/602; 417/406–407; 415/175, 177–178, 234, 185, 415/188; 416/97 R; F02C 6/12; F01D 5/18
See application file for complete search history.

(56) References Cited

U.S. PATENT DOCUMENTS

| | | | | | |
|---|---|---|---|---|---|
| 3,966,351 | A | * | 6/1976 | Sproule | 415/175 |
| 4,183,714 | A | * | 1/1980 | Gosling | 415/175 |
| 4,416,581 | A | * | 11/1983 | Geary, Jr. | 416/97 R |
| 4,478,553 | A | * | 10/1984 | Leibowitz et al. | 416/97 R |
| 5,735,676 | A | * | 4/1998 | Loos | 417/407 |
| 6,238,179 | B1 | * | 5/2001 | Wunderwald et al. | 415/175 |
| 6,257,834 | B1 | * | 7/2001 | Bremer et al. | 415/178 |
| 6,416,281 | B1 | * | 7/2002 | Bremer et al. | 416/95 |
| 6,823,691 | B1 | * | 11/2004 | Ohta | 62/500 |

FOREIGN PATENT DOCUMENTS

| | | | | |
|---|---|---|---|---|
| DE | 19652754 | A1 | * | 6/1998 |
| DE | 198 45 375 | | | 4/2000 |
| GB | 2305974 | A | * | 4/1997 |
| JP | 58214697 | A | * | 12/1983 |

* cited by examiner

*Primary Examiner*—Thai-Ba Trieu
(74) *Attorney, Agent, or Firm*—Klaus J. Bach

(57) ABSTRACT

In an exhaust gas turbocharger including a compressor wheel, the compressor wheel is cooled by at least one nozzle which is arranged in close axial proximity to the axis of rotation of the compressor wheel for spraying the backside of the compressor wheel near the center thereof with coolant whereby the coolant, utilizing the centrifugal forces of the rotating compressor wheel, is completely distributed over the entire wheel back surfaces.

13 Claims, 4 Drawing Sheets

EXHAUST-GAS TURBOCHARGER

BACKGROUND OF THE INVENTION

The invention relates to an exhaust-gas turbocharger for an internal combustion engine with a cooled compressor wheel.

An exhaust-gas turbocharger which includes an arrangement for cooling the compressor wheel of the exhaust-gas turbocharger is already known (DE 198 45 375 A1). The rear wall of the compressor wheel is cooled by introducing a coolant at a radial distance from an outer edge or outer circumference of the compressor wheel. In order to flow along the rear wall of the compressor wheel therefore, the coolant has to overcome the centrifugal forces generated by rotation of the compressor wheel. Since the compressor wheel, reaches high rotational speeds, these centrifugal forces will only permit inadequate cooling of the back of the compressor wheel. Introducing the coolant at a radial distance from the outer edge or outer circumference of the compressor wheel furthermore means that compressed air can get into the coolant through a radial gap left between the outer wall of the compressor wheel and an inner wall of the housing, so that bubbles are formed on the rear wall. Such bubble formation, however, leads to an unfavorable heat transmission at the back of the compressor wheel, which has an adverse effect on cooling performance.

SUMMARY OF THE INVENTION

In an exhaust gas turbocharger including a compressor wheel, the compressor wheel is cooled by at least one nozzle which is arranged in close proximity to the axis of rotation of the compressor wheel for spraying the backside of the compressor wheel near the center thereof with coolant whereby the coolant, utilizing the centrifugal forces of the rotating compressor wheel, is distributed over the entire wheel back surfaces.

With the exhaust-gas turbocharger according to the invention cooling of the backside of the compressor wheel is improved.

Also the passage of compressed air from the front to the back of the compressor wheel is advantageously reduced. A so-called blow-by barrier furthermore ensures that the coolant is returned into a cooling circuit without blow-by.

The invention will be described in greater detail below on the basis of embodiments of the invention, which are shown in simplified form in the drawings.

DESCRIPTION OF THE PREFERRED OF EMBODIMENTS

Figure 1:
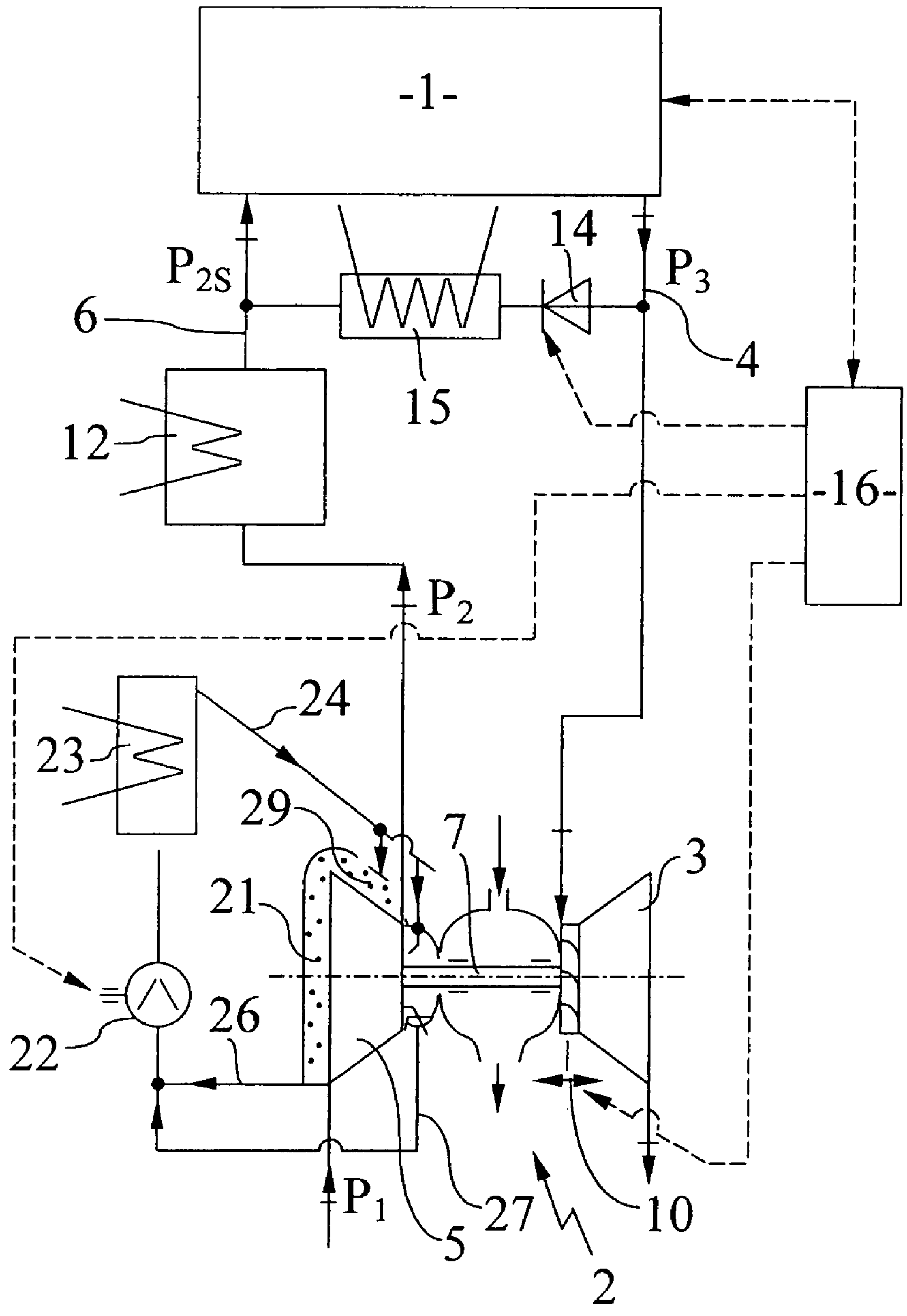
FIG. 1 shows a block diagram of a supercharged internal combustion engine with an exhaust-gas turbocharger and A cooling arrangement for the turbine wheel.

FIG. 1 shows a supercharged internal combustion engine 1, which may be a spark-ignition engine, a diesel engine or a gas engine. The internal combustion engine 1 includes an exhaust-gas turbocharger 2 with a turbine 3 in an exhaust line 4, which extends from the internal combustion engine 1, and a compressor 5 in an intake section 6 of the engine 1. A shaft 7 transmits the movement of a turbine wheel of the turbine 3 to a compressor wheel 8 of the compressor 5, whereupon fresh intake air at atmospheric pressure p1 is compressed to an increased pressure p2 in the compressor 5. The exhaust-gas turbine 3 of the exhaust-gas turbocharger 2 is provided with a variable turbine geometry 10, by means of which the effective flow inlet cross-section to the turbine wheel can be variably adjusted. The variable turbine geometry 10 takes the form, for example, of a guide vane ring with adjustable guide vanes arranged in the flow inlet cross-section of the turbine 3. It is also possible, however, to provide a so-called slide-valve solution for varying the flow inlet cross-section to the turbine wheel, as is shown in more detail in FIG. 2. The slide-valve solution here provides for a double-flow turbine housing, in which an axially displaceable ring can be fully varied so as to open or close the flows. The slide-valve solution is intended in particular for diesel engine applications.

The air compressed by the compressor 5 and duly cooled by its passage through an air intercooler 12 passes into combustion chambers of the internal combustion engine. The cooling has a positive effect in increasing the air density and the charge-air quantity. By way of an exhaust gas recirculation (EGR) valve 14 and an EGR cooler 15 exhaust gas, controlled by an electronic control device 16, can be mixed with the compressed air downstream of the intercooler 12. The quantity of exhaust gas returned to the combustion air leads to an improvement in the exhaust emission values, particularly those for nitrogen oxides (NOx reduction). The prevailing pressure differential P3–P2s downstream of the intercooler 12 serves to feed the exhaust gas to the compressed air.

Figure 2:
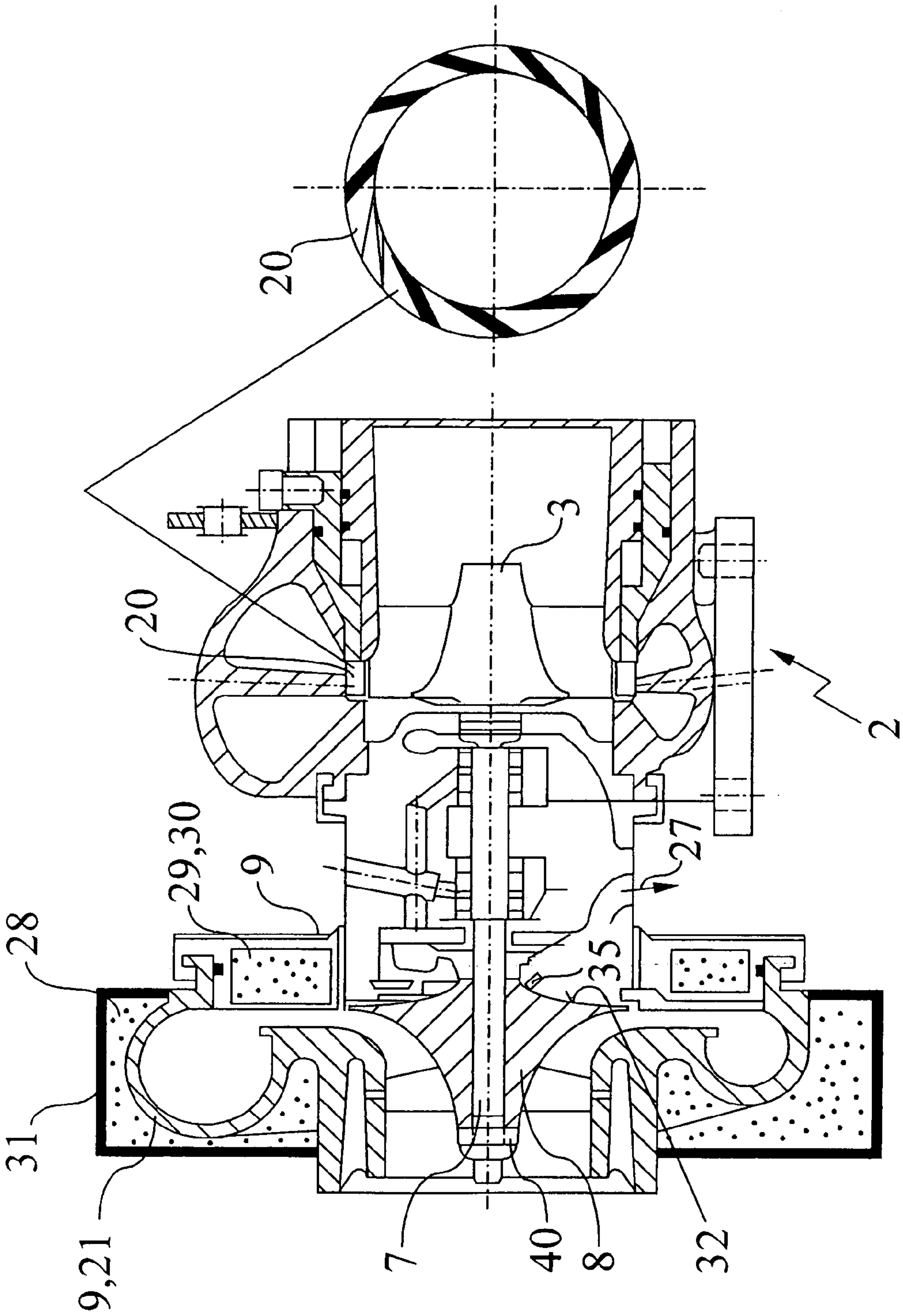
FIG. 2 shows an axial sectional view of the exhaust-gas turbocharger.

A spiral housing 21 of the compressor 5 may be encased for cooling the housing of the compressor 5, as is shown in more detail in FIG. 2. The coolant flows through an optimized cooling duct 28 between the spiral housing 21 and an outer wall 31 of the compressor 5, the spiral housing 21 being part of a compressor housing 9. A pump 22 represented in FIG. 1 is part of a self-contained compressor cooling circuit, which includes a heat exchanger 23, a line 24 to the compressor 5 and outflow lines 26, 27. The pump 22 is controlled by a control unit 16. In addition to the EGR valve 14 the control unit 16 also controls the variable turbine geometry 10, for example by way of the variable guide vane ring or in a turbine housing of multi-flow design by way of an axial slide valve 20 according to FIG. 2. In addition to the provision of a self-contained cooling circuit, however, it is also possible to draw cooling water from the cooling circuit of the internal combustion engine (engine cooling) to cool the compressor.

Water or oil or some other suitable medium may be used as coolant. It is also possible to use a refrigerant, which is capable of boiling or vaporizing in a low temperature range. The vaporization temperature in this case may be lower than 120° Celsius. In addition to water, therefore, the self-contained cooling circuit shown in FIG. 1 may also be operated using oil. It is also feasible here to incorporate the compressor cooling into the oil circuit of the internal combustion engine or even to link the cooling oil to the engine lubricating oil reservoir.

As FIG. 2 more fully shows, the following cooling measures are possible either individually or in any combination with one another:

a) Cooling of the compressor housing: heat extraction from the flow of air in the spiral duct 21,
b) Cooling of a diffuser area 29 of the compressor 5 by a coolant flow, which is provided, for example, in an annular duct 30 in the compressor housing 9,
c) Cooling of wheel back 32 of the compressor wheel 8,
d) Cooling at the wheel inlet of the compressor wheel 8, if the cooling medium temperature can be kept below the air temperature of the air to be compressed.

Cooling the wheel back 32 of the compressor wheel 8 affords the advantage that air cooling occurs in the phase involving compression of the air in the wheel blade duct or the transfer of energy from the compressor blades to the air. The dissipation of heat from the air to be compressed improves the thermodynamic efficiency of the compressor. The cooling measures at points a) and b) have an equivalent effect to that of a heat exchanger, whereas the cooling at point c) has a positive effect on the efficiency of the compressor 5.

The total heat dissipation $Q_{total}$ from the compressed air is obtained from the sum of the heat dissipated from the compressor 5 $Q_{compressor}$ and the heat dissipated from the intercooler 12 $Q_{intercooler}$ connected to the outlet side of the compressor 5 as:

$$Q_{total}=Q_{compressor}+Q_{intercooler}.$$

From the point where $Q_{compressor}$ as a fraction of $Q_{total}>15\%$ there is an increasing and very significant trend in the compressor cooling towards the maintenance of single-stage supercharging and high EGR rates for NOx reduction. At this relative proportion the downstream elements are markedly unaffected by the temperature level. Where $Q_{compressor}$ as a fraction of $Q_{total}>20\%$ the existing series production materials can be used largely unchanged, which affords a great advantage in the development of intercoolers whilst retaining the aluminum material.

Figure 3:
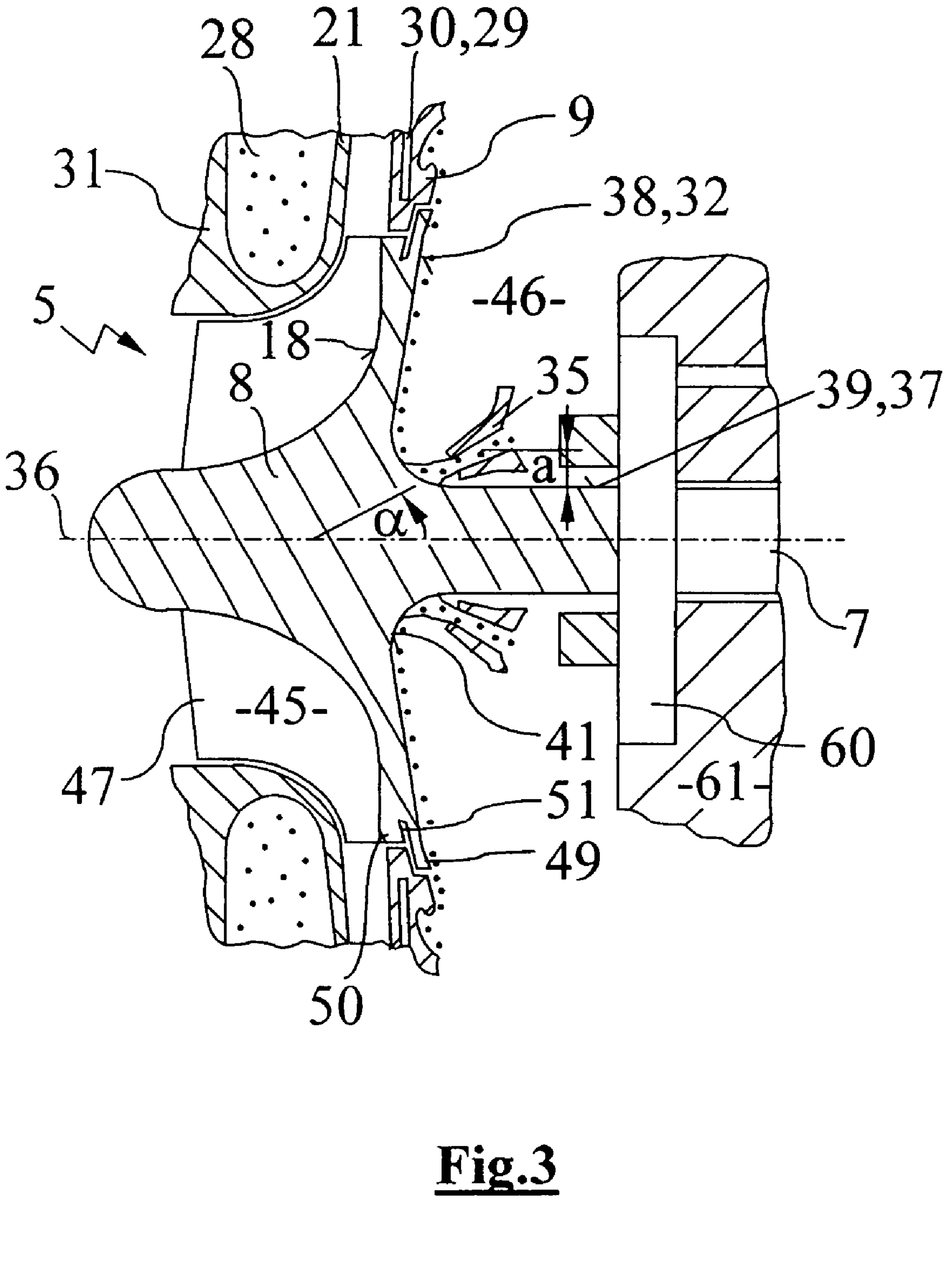
FIG. 3 shows an axial sectional view of a cooled compressor wheel in a first embodiment according to the invention.

FIG. 3 shows a first example of an embodiment of cooling for the back of a compressor wheel. The coolant is applied to the wheel back 32 of the compressor wheel 8 via two nozzles 35. Feed lines 24, not shown in FIG. 3, are provided in the housing of the exhaust gas turbocharger 2 to supply coolant to the nozzles 35. The coolant may be oil or water. The nozzles 35 are arranged close to the axis of rotation 36 of the compressor 5, which corresponds to the axis of the shaft 7. A radial distance a between the center of the nozzle 35 and an outer surface 37 of the shaft 7 or a corresponding hub area of the wheel back 32 of the compressor wheel 8 should not exceed the radius of the shaft 7 or of the hub of the wheel back 32. An included angle $\alpha$ between axis of rotation 36 and coolant emerging from the nozzle 35 should be in the range from approximately 0° to 60°.

The wheel back 32 comprises a radial section 38, a curved section 41 and an axial section 39. The axial section 39 merges smoothly, without any change in diameter, for example, into the shaft 7. The compressor wheel 8 is preferably affixed to the shaft 7 without any holes, that is to say without any fastening bolt 40 (FIG. 1) as shown in FIG. 2. The compressor wheel 8 and the shaft 7 can be joined, without any holes, by means of a compression coupling, for example, or other suitable means of connection. The use of a compressor wheel 8 without bored holes has the advantage, compared to a compressor wheel with bored hole, that the thermal conduction between shaft material and compressor wheel material is not impaired, so that better cooling can be achieved. Designing the hub body of the compressor wheel 8 without holes leads to an increased temperature reduction in the stress-critical areas, so that cost-effectively manufactured compressor wheels from a standard aluminum casting process can withstand the higher charge pressures that are required or the circumferential speeds at the wheel outlet of the compressor wheel 8.

The transition between radial section 38 and axial section 39 of the wheel back 32 is curved, coolant being delivered into the curved section 41 via the nozzles 35 in such a way that it is distributed radially outwards from the hub by the centrifugal forces of the compressor wheel 8. This permits a uniform distribution of the coolant over the wheel back 32. The uniform distribution or wetting with coolant results in efficient cooling of the wheel back 32 of the compressor wheel 8. More nozzles can obviously also be provided in addition to the two nozzles 35 shown.

In order to seal off the compressor wheel 8 between a compression space 45 on a front side 18 of the compressor wheel 8 with the compressor blades 47 and a cooling space 46 in the wheel back area, the transition between the wheel front side 18 of the compressor wheel 8 to the wheel back 32 is of radially stepped design with different wheel diameters, a radially protruding part 49 projecting beyond the compressor blades 47. A groove 51 is provided between the radially protruding part 49 and a front section 50 axially adjoining the compressor blades 47. The compressor housing 9 is of corresponding radially stepped design but is stepped inversely to the section 50 and the part 49, so that a labyrinth seal is produced between the compression space 45 and the cooling space 46, which largely prevents any passage of compressed air from the compression space 45 to the cooling space 46.

As FIG. 3 shows, the shaft 7 with the compressor wheel 8 is seated on an axial bearing 60, which is generally oil lubricated. If the wheel back 32 is sprayed with oil through the nozzles 35, this may also be used to lubricate the bearing, in particular the axial bearing and also a radial bearing. The bearing housing (61) and the cooling space 46 virtually constitute one undivided unit. Oil carrying the heat which it has absorbed flows in the usual manner out of the exhaust-gas turbocharger 2 to a crankcase of the internal combustion engine.

Figure 4:
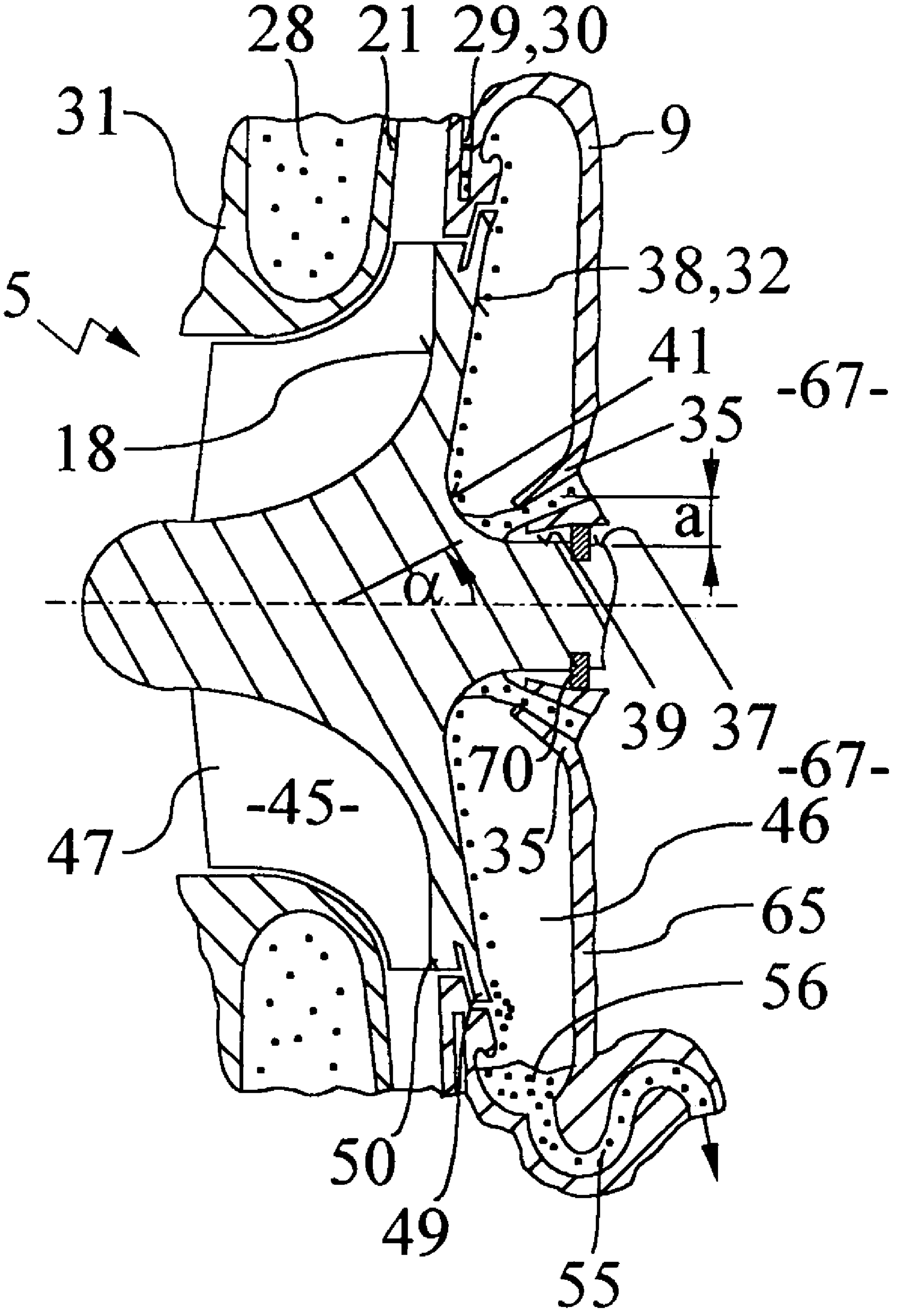
FIG. 4 shows an axial sectional view of the compressor wheel in a second embodiment according to the invention.

FIG. 4 shows a second example of an embodiment of cooling for a wheel back 32 by means of at least one nozzle 35, in which all identical or equivalent parts are identified by the same reference numbers as in the first embodiment. In contrast to FIG. 3, the cooling space 46 is separated by a radial partition or dividing wall 65 from a bearing area 67 (not shown further) for the axial bearing and the radial bearing of the exhaust-gas turbocharger 2. This design allows water to be used as coolant, since the bearing area 67 is sealed off from the cooling area 46. The cooling water is removed from the cooling space 46 via a siphon-like outlet duct 55 and passes, for example, into the self-contained cooling circuit with pump 22 and heat exchanger 23. The siphon-like outlet duct 55 is at the same time provided in the compressor housing 9 of the exhaust-gas turbocharger 2 for returning the coolant. The oil first collects in a collecting chamber 56 and then passes out of the exhaust-gas turbocharger 2 via the double-bend outlet duct 55 or outlet line. The siphon-like return of the coolant in the outlet duct 55 has the advantage that there is scarcely any compression air or so-called blow-by quantities left in the coolant, so that return via the pump 22 is now possible without any problem. The coolant flows out by means of gravity. The layout of the outlet duct 55 must be designed so that coolant cannot accumulate to an inadmissibly high level in the cooling space 46. Seal rings 70 are provided between the nozzles 35 and the outer surface 37 of the shaft 7 or a hub area of the compressor wheel 8 for sealing off in relation to the bearing area 67. In principle, it is also possible, however, to use oil instead of cooling water.

What is claimed is:

1. An exhaust-gas turbocharger for an internal combustion engine, including a compressor (5) having a compressor wheel (8) with a shaft (7) and a wheel back (32) which is cooled by a coolant, and at least one nozzle (35) arranged in a first cooling space (46) adjacent the shaft (7) of the compressor wheel (8) for spraying coolant directly onto the wheel back (32) adjacent the radially inner end thereof, so that the coolant flows radially outwardly along the rear wall of the compressor wheel, said nozzle (35) being arranged such that a radial distance (a) between the center of the nozzle (35) and an outer surface (37) of the shaft of the compressor (5) does not exceed the radius of the shaft (7).

2. An exhaust-gas turbocharger according to claim 1, wherein there is a transition area from a front side (18) to the wheel back (32) of the compressor wheel (8) which is stepped to form of a labyrinth seal.

3. An exhaust-gas turbocharger according to claim 2, wherein the steps of the transition area from the front side (18) to the wheel back (32) of the compressor wheel (8) are provided by means of a stepped diameter structure at the radially outer end of the compressor wheel (8).

4. An exhaust-gas turbocharger according to claim 1, wherein a second cooling space (28) surrounds a spiral housing (21) of the compressor (5), and means are provided for supplying a coolant to said second cooling space (28) for cooling the compressor (5).

5. An exhaust-gas turbocharger according to claim 1, wherein the compressor (5) includes a housing with an annular duct (30) forming a diffuser area (29) and a coolant for cooling the diffuser area (29) and the compressor (5) is conducted through said annular duct (30).

6. An exhaust-gas turbocharger according to claim 1, wherein at least two nozzles (35) are provided, which are arranged in an angular range α of approximately 0°–60° to the axis of rotation (36) of the compressor wheel (8).

7. An exhaust-gas turbocharger according to claim 1, wherein the coolant is one of oil and water.

8. An exhaust-gas turbocharger according to claim 1, wherein the coolant is a refrigerant which is capable of boiling or vaporizing in a low temperature range.

9. Exhaust-gas turbocharger according to claim 8, wherein the vaporization temperature of the refrigerant is lower than 120° Celsius.

10. An exhaust-gas turbocharger according to claim 1, wherein the coolant is removed from an isolated area of said first cooling space (46) of the compressor wheel (8) via a siphon duct (55) in the exhaust-gas turbocharger (2).

11. An exhaust-gas turbocharger according to claim 1, wherein the compressor wheel (8) is designed without any bored holes.

12. An exhaust-gas turbocharger according to claim 1, wherein there is no dividing wall between a space (46) for cooling the compressor wheel and a space (61) for a rotor bearing (60).

13. An exhaust-gas turbocharger according to claim 1, wherein the heat dissipation from the compressor area due to cooling of the air in the compressor (5) $Q_{compressor}$ is more than 20% of the total heat dissipation $Q_{total}$ from the compressed air, the total heat dissipation $Q_{total}$ being obtained from the sum of the heat dissipated from the compressor $Q_{compressor}$ and the heat dissipated from an intercooler (12) $Q_{intercooler}$ as: $Q_{total}=Q_{compressor}+Q_{intercooler}$.

* * * * *